Nov. 8, 1927.

J. S. CLAPPER 1,648,720

MACHINE FOR SPREADING FERTILIZER

Filed Jan. 5, 1924     2 Sheets-Sheet 1

INVENTOR
JOHN S. CLAPPER

By Paul, Paul & Moore
ATTORNEYS

Nov. 8, 1927. 1,648,720
J. S. CLAPPER
MACHINE FOR SPREADING FERTILIZER
Filed Jan. 5, 1924 2 Sheets-Sheet 2
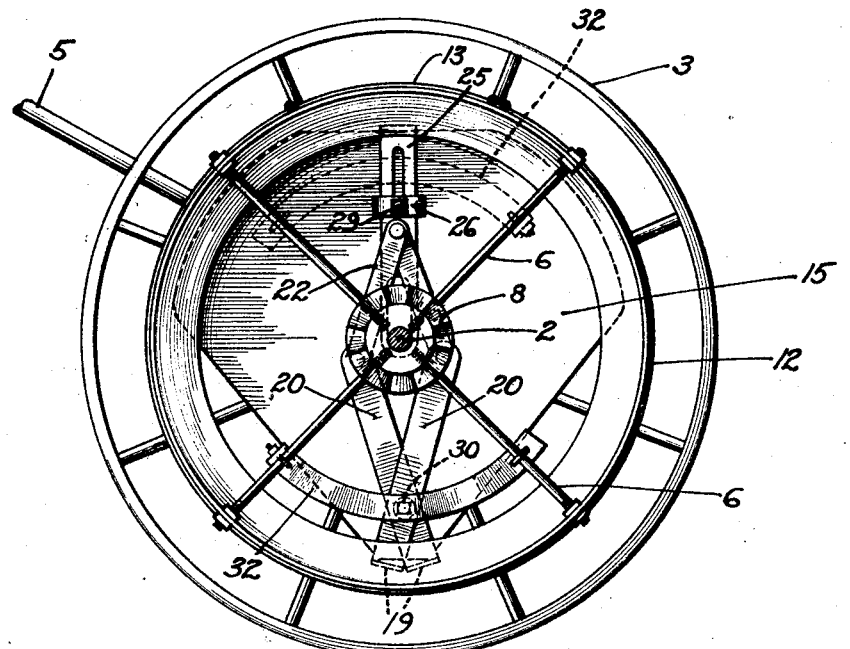
FIG. 3
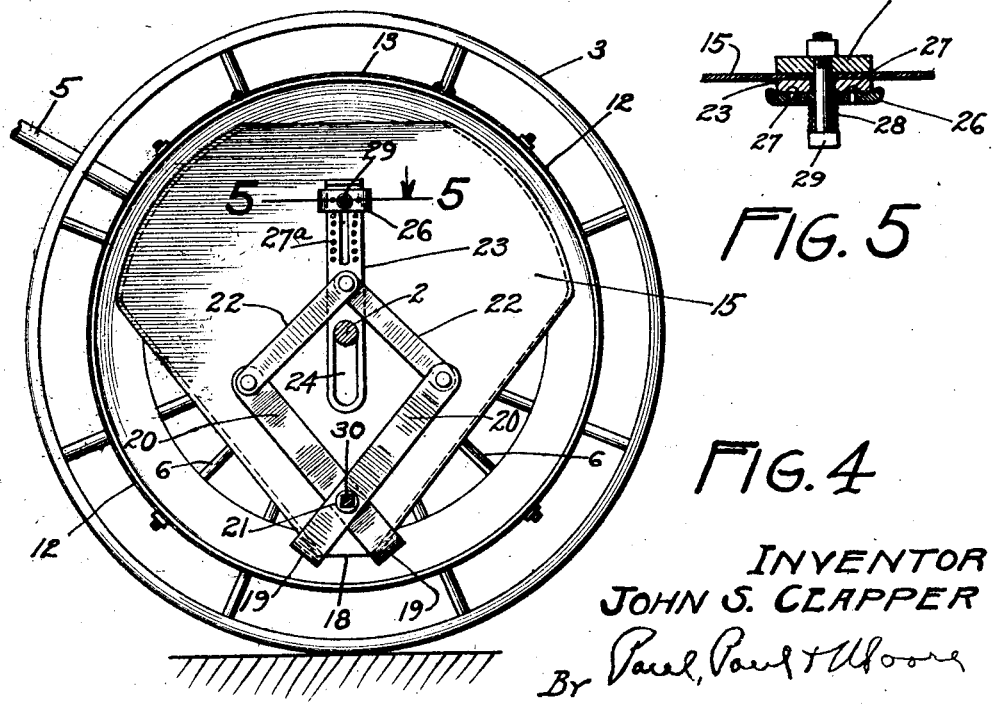
FIG. 4
FIG. 5
INVENTOR
JOHN S. CLAPPER
ATTORNEYS Patented Nov. 8, 1927.

1,648,720

UNITED STATES PATENT OFFICE.

JOHN S. CLAPPER, OF MINNEAPOLIS, MINNESOTA.

MACHINE FOR SPREADING FERTILIZER.

Application filed January 5, 1924. Serial No. 684,596.

The object of my invention is to provide an apparatus for spreading fertilizer designed particularly for use on the putting greens of golf courses and lawns for the purpose of spreading or distributing finely ground fertilizer evenly and thoroughly over the sod so that it can be readily absorbed by the grass roots without interfering materially with the use of a putting green.

A further object is to provide a fertilizer spreader which will not only insure even distribution of the fertilizing material on the putting green but will enable a number of greens to be fertilized in a comparatively short space of time.

A further object is to provide a fertilizer spreader of simple inexpensive construction which can be easily moved from one green to another.

In the accompanying drawings forming part of this specification,

Figure 3 is a sectional view on the line 3—3 of Figure 1;

Figure 4 is a sectional view on the line 4—4 of Figure 1;

Figure 5 is a detail view on the line 5—5 of Figure 4 showing the means for locking the gates which control the feed of material from the hopper.

Figure 1:
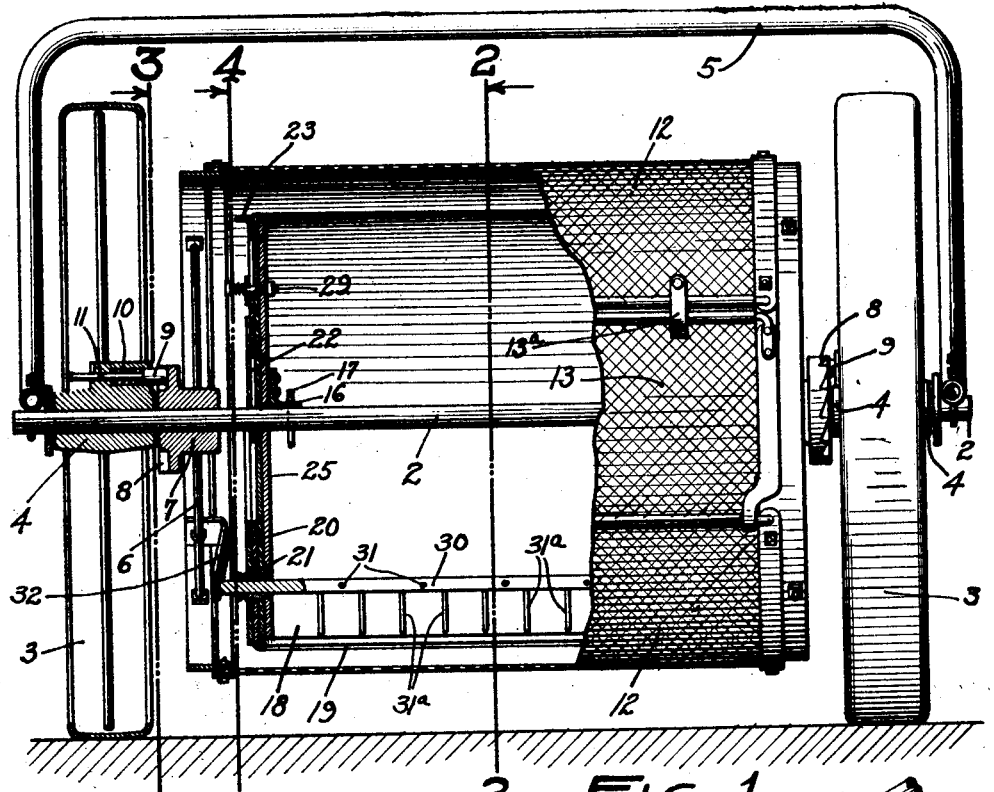
Figure 1 is a view partially in section showing a fertilizer spreader embodying my invention.

In the drawing, 2 represents a suitable axle having carrying wheels 3 provided with hubs 4 loosely journaled on the axle. A bail 5 is connected to the ends of the axle by means of which the operator of the machine may move it back and forth over the green or lawn or from one green or lawn to another. Between the wheels and adjacent thereto, I provide spiders 6 having hubs 7 also loosely journaled on the axle 2 and each hub has a series of ratchet teeth 8 engaged by spring pressed latches 9 that are mounted in the hubs 4 of the carrying wheels and form with said teeth a rigid drive connection between the wheels and the spiders. The latches are adapted to be withdrawn from engagement with the teeth against the tension of springs 10, and when withdrawn are rotated to allow a pin 11 to engage the wall of the hub and hold the latches in their retracted position. This is for convenience in moving the machine from one place to another when it is desirable to have the spreading apparatus stationary instead of turning with the wheels.

Figure 2:
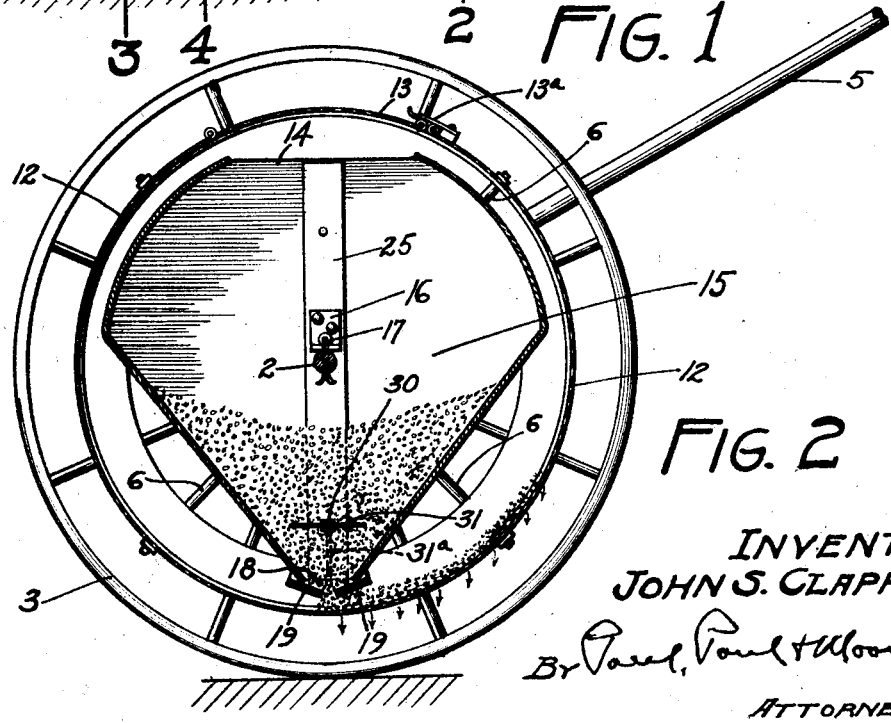
Figure 2 is a sectional view on the line 2—2 of Figure 1.

Between the spiders and secured thereto by suitable means is a cylindrical screen 12 of suitable mesh for distributing the fertilizer evenly over the surface of the ground. This screen normally revolves with the wheels and spiders. The wall of the screen has an opening and a cover 13 therefor provided with a suitable latch 13ª which, when released will allow the cover to be opened for the purpose of having access to the interior of the screen and to the filling opening 14 of a hopper 15 that is mounted concentric with the axle 2 and secured thereto by a suitable means such as a bracket 16 and cotterpin 17. When the opening in the screen has been adjusted to register with the filling opening of the hopper, the fertilizing material may be deposited in the hopper; the lower walls of which converge and terminate at the bottom in a discharge opening 18 that is near the surface of the screen. As the material falls out of the hopper onto the screen it is carried around on the meshes thereof, as shown in Figure 2, and is gradually sifted and worked through the screen and distributed evenly thereby over the surface of the green or lawn.

For the purpose of regulating the size of the hopper discharge opening and the feed of the material therethrough, I provide a pair of bars 19 having upwardly turned ends 20 which are pivoted one upon the other at 21 above and adjacent the hopper discharge opening. The ends of the bars project upwardly from this pivotal point and links 22 are pivotally connected thereto and to a slide 23 having a longitudinal slot 24 to receive the axle 2 and on which said slide is free to move vertically. Evidently, the up and down movement of this slide will oscillate the arms 20 and swing the bars 19 toward or from each other to open or close the hopper feed opening.

A bar 25 is secured to the end wall of the hopper on the inside. A plate 26 has studs 27 mounted therein to enter sockets 27ª provided in the surface of the slide 23, said plate and slide being held in yielding relation by a spring 28 mounted on a bolt 29 which passes through said plate, the slide 23, wall of the hopper 15 and the bar 25, see Figure 5. By raising and lowering the slide 23, the feed opening of the hopper can be increased or decreased in size to regulate the flow of the fertilizer from the hopper. The studs fitting the sockets in the slide will hold it and the bars in their adjusted position.

For the purpose of agitating the material in the hopper and preventing it from clogging and arching over the delivery opening, I provide a rod 30 mounted to slide in bearings as pivoting elements 21 in the side walls of the hopper and having a series of horizontal and depending pins 31 and 31ª which are adapted to sweep back and forth over the hopper feed opening; the rod having freedom of reciprocating movement in its bearings. To move the rod, I provide cams 32 mounted on the spiders upon opposite sides of the axle in position to contact with the ends of the rod 30 and move it back and forth in the fertilizing material in the hopper. The cams are so positioned that the agitator will be moved in one direction during one half of the stroke of the screen and spiders and in the opposite direction during the remainder of the stroke or revolution of the screen and spiders and thus as the machine is operated, the material in the hopper will be kept in constant agitation and a uniform stream fed down through the delivery opening upon the surface of the revolving screen beneath. The constant revolution of the screen or sifter will keep the fertilizing material in motion thereon and cause its feed in a fine or comminuted condition upon the surface of the sod beneath. I am able, therefore, to very evenly spread the fertilizer back and forth over the surface of a green or lawn and cover a comparatively large area easily and quickly.

By the use of this machine, I am able to prevent coarse rough material and oversize stuff, stems, sticks, and the like, frequently found in putting green fertilizer or compost from being delivered onto the surface of the green; and whenever desired the hopper may be inverted by rotating the axle until the filling opening is on the under side and when this opening is adjusted opposite the screen opening the refuse contents of the hopper and the screen may be discharged upon the ground.

The machine may be made in different sizes and the capacity of the hopper may be varied to suit different conditions of use and the screen encircling the hopper may be made with meshes of different degrees of fineness according to the character of the material that is being sifted on the putting green or lawn and the volume of feed desired.

I claim as my invention:

1. A device of the class described comprising an axle, having wheels rotatable thereon, a distributing screen drum rotatable upon the axle, between the wheels, means for driving the drum by the wheel, a hopper hung upon, fixed to and traversed by the axle and disposed within the screen drum and having a discharge opening at its lower end, said screen having a hopper feeding opening closed by a door.

2. A device of the class described comprising an axle, having wheels rotatable thereon, a distributing screen drum rotatable upon the axle between the wheels, means for driving the drum by the wheel, a hopper hung upon and traversed by the axle and disposed within the screen drum and having a discharge opening at its lower end, an agitator slidable through and carried by the hopper, and cams carried by the screen drum engageable with the agitator to reciprocate the same alternately in opposite directions.

3. A device of the class described comprising an axle, having wheels rotatable thereon, a distributing screen drum rotatable upon the axle, between the wheels, means for driving the drum by the wheel, a hopper hung upon and traversed by the axle and disposed within the screen drum and having a discharge opening, an agitator slidable through and carried by the hopper, and cams carried by the screen drum engageable with the agitator to reciprocate the same alternately in opposite directions, said screen having a hopper feeding opening closed by a door.

4. A device of the class described comprising an axle having wheels rotatable thereon, a distributing screen drum rotatable upon the axle between the wheels and partly open at the ends, means for driving the drum by the wheel, a hopper hung upon and traversed by the axle and disposed within the screen drum and having a discharge opening at its bottom, bars having crossed extensions, elements pivoting said extensions to the hopper at point of crossing and having portions arranged to completely close the hopper discharge opening when brought toward one another, and further arranged to regulate the amount of discharge through said opening when separated in predetermined degrees, and toggle means connecting with the extensions and encircling the axle and accessible from the outer side of the hopper, through the open ends of the screen drum, for adjusting, and for holding the extensions in adjusted position.

5. A device of the class described comprising an axle having wheels rotatable thereon, a distributing screen drum rotatable upon the axle, between the wheels and partly open at the ends, means for driving the drum by the wheel, a hopper hung upon and traversed by the axle and disposed within the screen drum and having a discharge opening at its bottom, bars having crossed extensions, elements pivoting said extensions to the hopper at point of crossing and having portions arranged to completely close the hopper discharge opening when brought toward one another, and further arranged to regulate the amount of discharge through said opening when separated in predetermined degrees, and means connecting with the extensions, accessible from the outer side of the hopper through the open ends of the screen drum for adjusting, and for holding the extensions in adjusted position.

6. A device of the class described comprising an axle having wheels rotatable thereon, a distributing screen drum rotatable upon the axle, between the wheels, means for driving the drum by the wheel, a hopper hung upon and traversed by the axle and disposed within the screen drum and having a discharge opening at its bottom, discharge opening control bars having crossed extensions, elements pivoting said extensions to the hopper at point of crossing, an agitator slidable through the hopper and through said extension pivoting elements, and projecting beyond the hopper, and cams carried by the screen drum and engageable with the agitator to reciprocate the same alternately in opposite directions, said screen having a hopper feeding opening.

In witness whereof, I have hereunto set my hand this 29th day of December, 1923.

JOHN S. CLAPPER.